United States Patent
Tian et al.

(10) Patent No.: US 9,485,334 B2
(45) Date of Patent: Nov. 1, 2016

(54) RESPONSE TIME RELAXATION FOR HIGH EFFICIENCY WLAN

(71) Applicant: QUALCOMM Incorporated, San Diego, CA (US)

(72) Inventors: Bin Tian, San Diego, CA (US); Sameer Vermani, San Diego, CA (US); Albert Van Zelst, Woerden (NL); Didier Johannes Richard Van Nee, Tull en't Waal (NL)

(*) Notice: Subject to any disclaimer, the term of this patent is extended or adjusted under 35 U.S.C. 154(b) by 0 days.

(21) Appl. No.: 14/645,044

(22) Filed: Mar. 11, 2015

(65) Prior Publication Data

US 2015/0264161 A1 Sep. 17, 2015

Related U.S. Application Data

(60) Provisional application No. 62/034,673, filed on Aug. 7, 2014, provisional application No. 61/951,989, filed on Mar. 12, 2014.

(51) Int. Cl.

| | |
|---|---|
| H04W 4/00 | (2009.01) |
| H04L 29/06 | (2006.01) |
| H04L 1/00 | (2006.01) |
| H04L 27/26 | (2006.01) |
| H04L 1/18 | (2006.01) |
| H04W 84/12 | (2009.01) |

(52) U.S. Cl.
CPC ............ *H04L 69/22* (2013.01); *H04L 1/0009* (2013.01); *H04L 1/0086* (2013.01); *H04L 1/1854* (2013.01); *H04L 1/1864* (2013.01); *H04L 27/2607* (2013.01); *H04W 84/12* (2013.01)

(58) Field of Classification Search
CPC ... H04L 69/22; H04L 1/1864; H04L 1/0086; H04L 1/1854; H04L 1/0009; H04L 27/2607; H04W 84/12

See application file for complete search history.

(56) References Cited

U.S. PATENT DOCUMENTS

| | | | |
|---|---|---|---|
| 7,729,281 B2 * | 6/2010 | Tzannes | ........... H04L 1/0028 370/252 |
| 2009/0092079 A1 | 4/2009 | Marinier et al. | |

(Continued)

FOREIGN PATENT DOCUMENTS

| | | |
|---|---|---|
| WO | WO-0241647 A2 | 5/2002 |
| WO | WO-2006000991 A1 | 1/2006 |
| WO | WO-2010038134 A2 | 4/2010 |

OTHER PUBLICATIONS

International Search Report and Written Opinion—PCT/US2015/020107—ISAEPO—May 26, 2015 (143736WO).

*Primary Examiner* — Afshawn Towfighi
(74) *Attorney, Agent, or Firm* — Patterson + Sheridan, L.L.P.

(57) ABSTRACT

Aspects of the present disclosure relate to techniques for generating responses to extended length frames having increased symbol lengths without changing the short interframe space duration. According to certain aspects, a method for transmitting an extended length frame generally includes generating a packet having a preamble decodable by a first type of device having a first set of capabilities and a second type of device having a second set of capabilities, wherein at least a first portion of the packet is generated using an increased symbol duration or increased cyclic prefix relative to a second portion of the packet generated using a standard symbol duration or standard cyclic prefix and the packet includes padding symbols after the first portion, and outputting the generated packet for transmission.

30 Claims, 10 Drawing Sheets

(56) References Cited

U.S. PATENT DOCUMENTS

2010/0085873 A1* 4/2010 Moons ............... H04L 43/062
 370/230

2016/0156750 A1* 6/2016 Zhang ................. H04L 69/22
 370/338

* cited by examiner

RESPONSE TIME RELAXATION FOR HIGH EFFICIENCY WLAN

CROSS REFERENCE TO RELATED APPLICATIONS

This application claims priority to U.S. Provisional Patent Application Ser. No. 61/951,989, filed Mar. 12, 2014 and entitled "Response Time Relaxation for High Efficiency WLAN," and U.S. Provisional Patent Application Ser. No. 62/034,673, filed Aug. 7, 2014 and entitled "Response Time Relaxation for High Efficiency WLAN," both of which are assigned to the assignee hereof and both of which are herein incorporated by reference.

BACKGROUND

1. Field

Certain aspects of the present disclosure generally relate to wireless communications and, more particularly, to response frame generation for transmissions using packets having increased symbol lengths or cyclic prefix lengths in relation to the preamble of the packet.

2. Background

Several challenges face wireless communications systems, such as WiFi systems. For example, there is a demand for WiFi systems to operate robustly in the outdoor environment.

In typical outdoor environment, the delay spread is much larger than those indoors so it requires the large cyclic prefix (CP or guard interval) in an OFDM symbol. Delay spread generally refers to the difference between the time of arrival of the earliest significant multipath component and the time of arrival of the latest multipath component. To keep the overhead of CP under control, generally a longer CP requires a longer OFDM symbol.

Unfortunately, a longer OFDM symbol can carry multiple times of more information bits than a normal duration OFDM, which may cause a challenge to the receiver to process the increased number of information bits in time to meet a required response timeline.

SUMMARY

Certain aspects of the present disclosure provide a method for wireless communications by a transmitting station. The method generally includes generating a packet having a preamble decodable by a first type of device having a first set of capabilities and a second type of device having a second set of capabilities, wherein at least a first portion of the packet is generated using an increased symbol duration or increased cyclic prefix relative to a portion of the packet generated using a standard symbol duration or standard cyclic prefix and the packet includes padding symbols after the first portion, and outputting the generated packet for transmission.

Certain aspects of the present disclosure provide a method for wireless communications by a receiving station. The method generally includes obtaining a packet having a preamble decodable by a first type of device having a first set of capabilities and a second type of device having a second set of capabilities, wherein at least a first portion of the packet is generated using an increased symbol duration or increased cyclic prefix relative to a portion of the packet generated using a standard symbol duration or standard cyclic prefix and the packet includes padding symbols after the first portion, and beginning to process the first portion of the packet before the apparatus has received entire packet and generate a response packet for transmission within an expected time after receipt of the entire packet.

Certain aspects of the present disclosure provide a method for wireless communications. The method generally includes obtaining an extended length packet having a preamble decodable by a first type of device having a first set of capabilities and a second type of device having a second set of capabilities, wherein at least a first portion of the extended length packet is generated using an increased symbol duration or increased cyclic prefix relative to a portion of the packet generated using a standard symbol duration or standard cyclic prefix, and generating at least a preamble of a response packet prior to receipt of the entire extended length packet.

Various aspects also provide various apparatuses, program products, and devices (e.g., wireless stations, such as access points and other types of wireless devices) capable of performing the operations of the methods described above.

DETAILED DESCRIPTION

Figure 1:
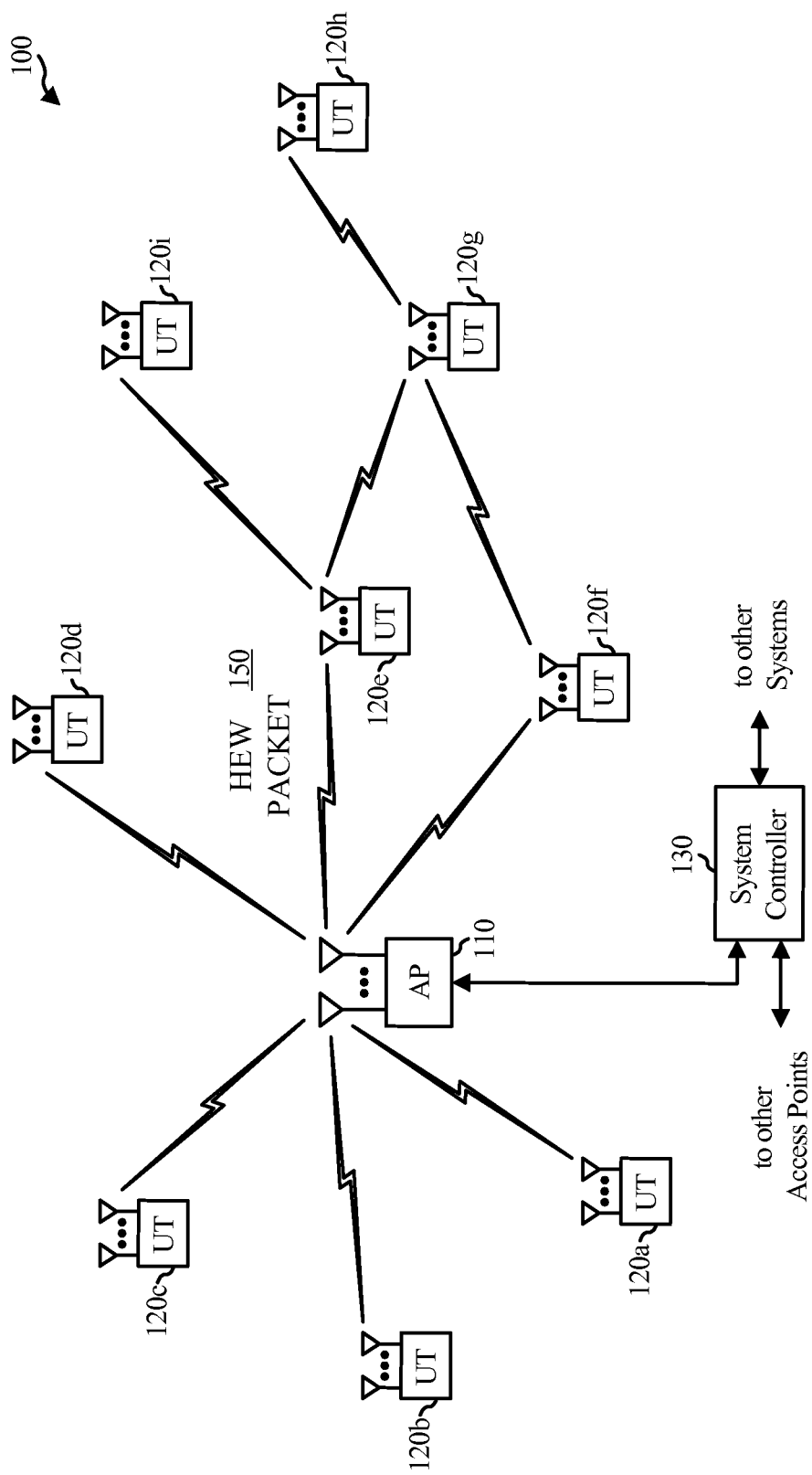
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure provide techniques that may provide for generating responses to extended length packets (i.e., packets having increased length symbols or increased length cyclic prefixes in relation to at least a portion of the preamble of the packet) without changing the short interframe space period.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
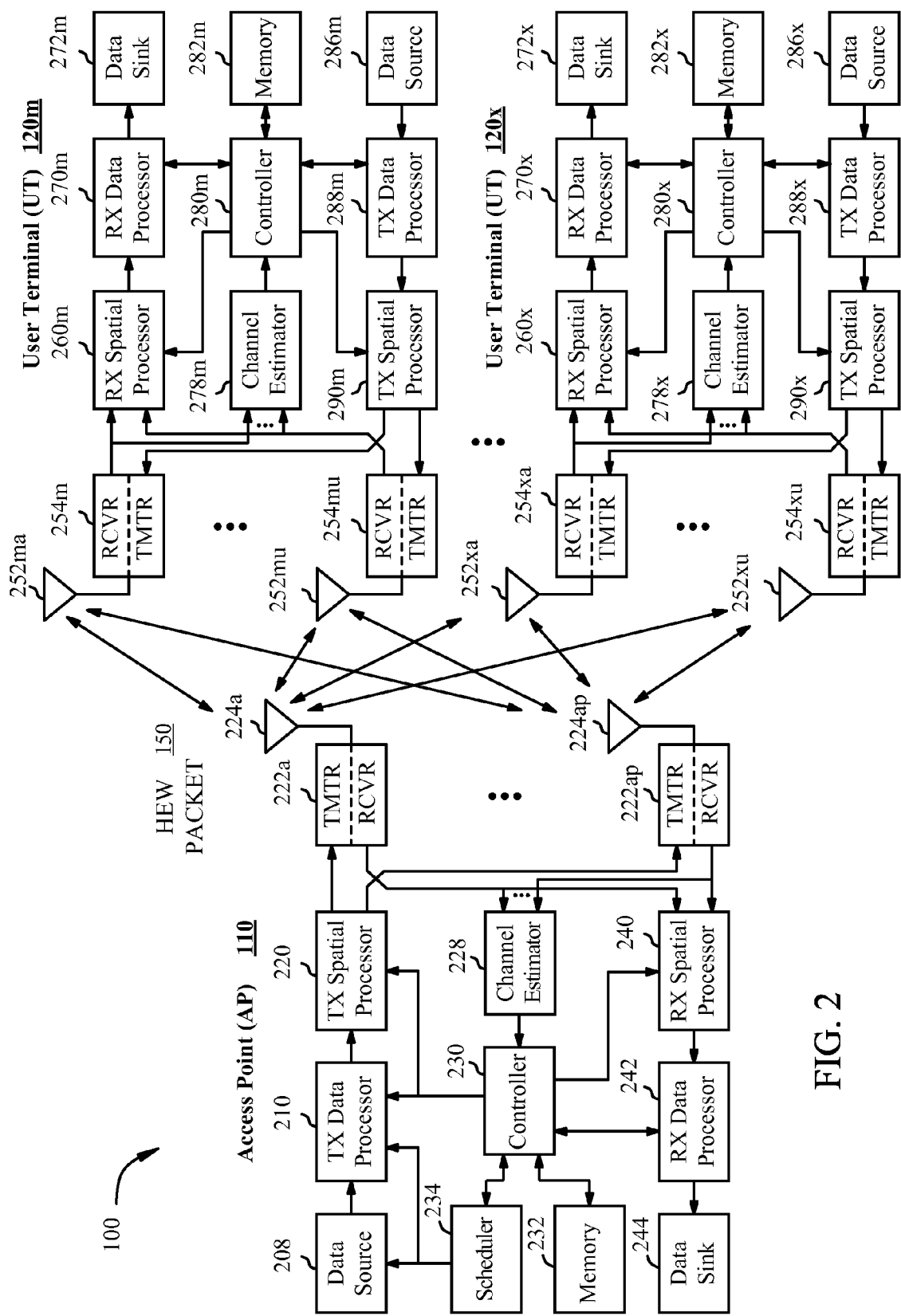
FIG. 2 illustrates a block diagram of an example access point and user terminals in accordance with certain aspects of the present disclosure.
Figure 6:
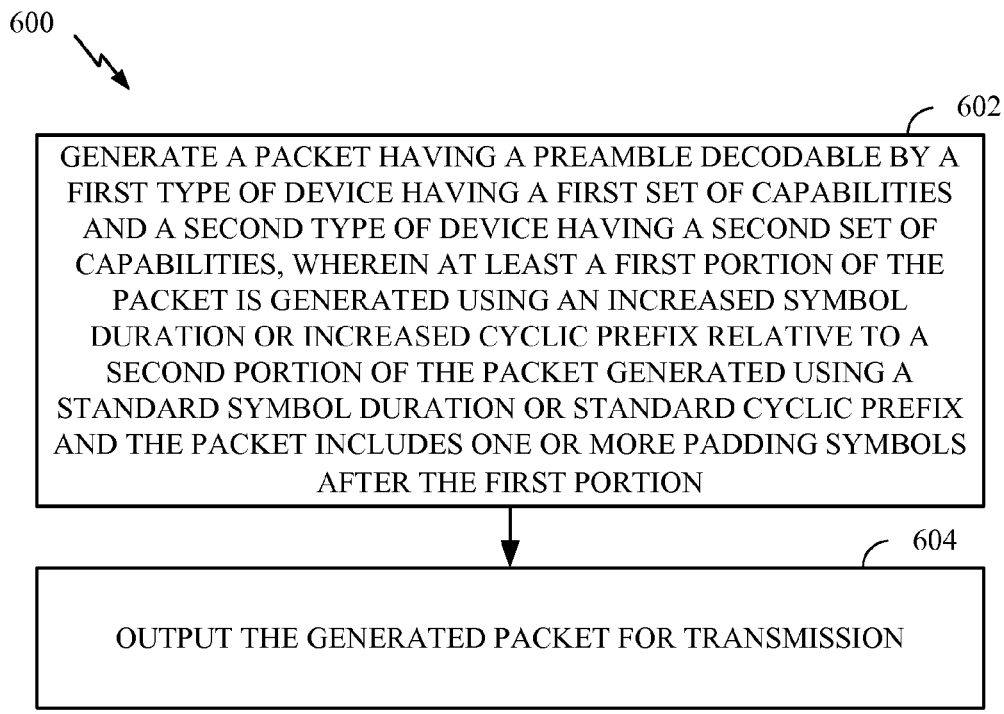
FIG. 6 illustrates example operations that may be performed by a transmitting station, in accordance with certain aspects of the present disclosure.
Figure 7:
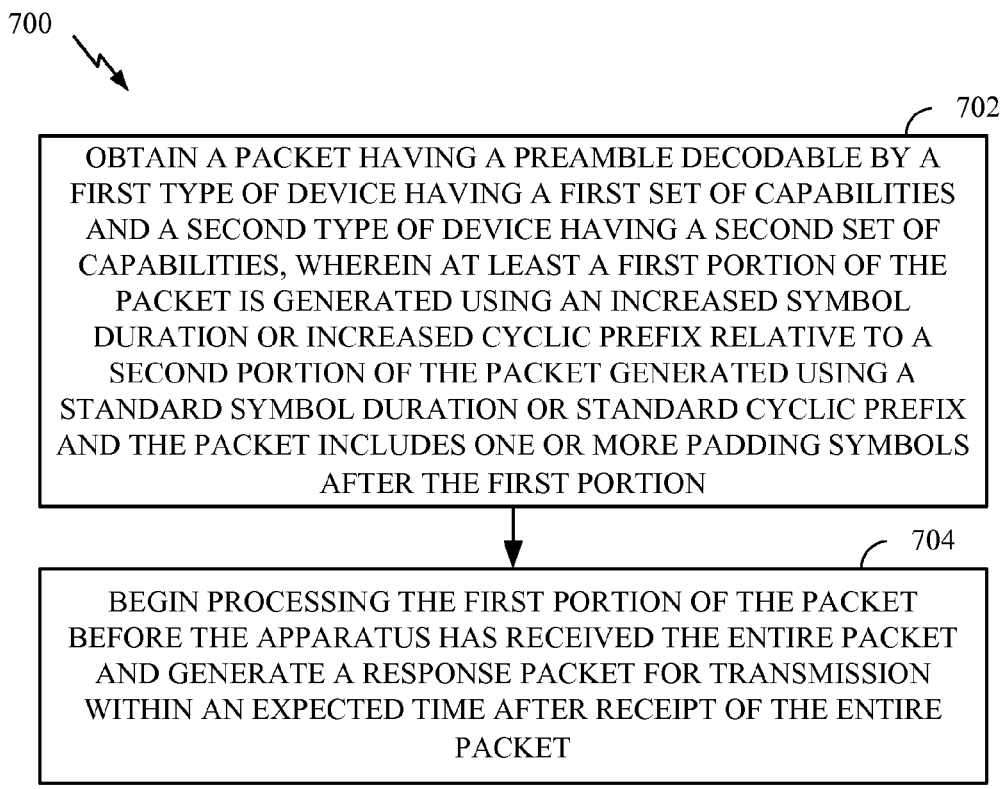
FIG. 7 illustrates example operations that may be performed by a receiving station, in accordance with certain aspects of the present disclosure.
Figure 8:
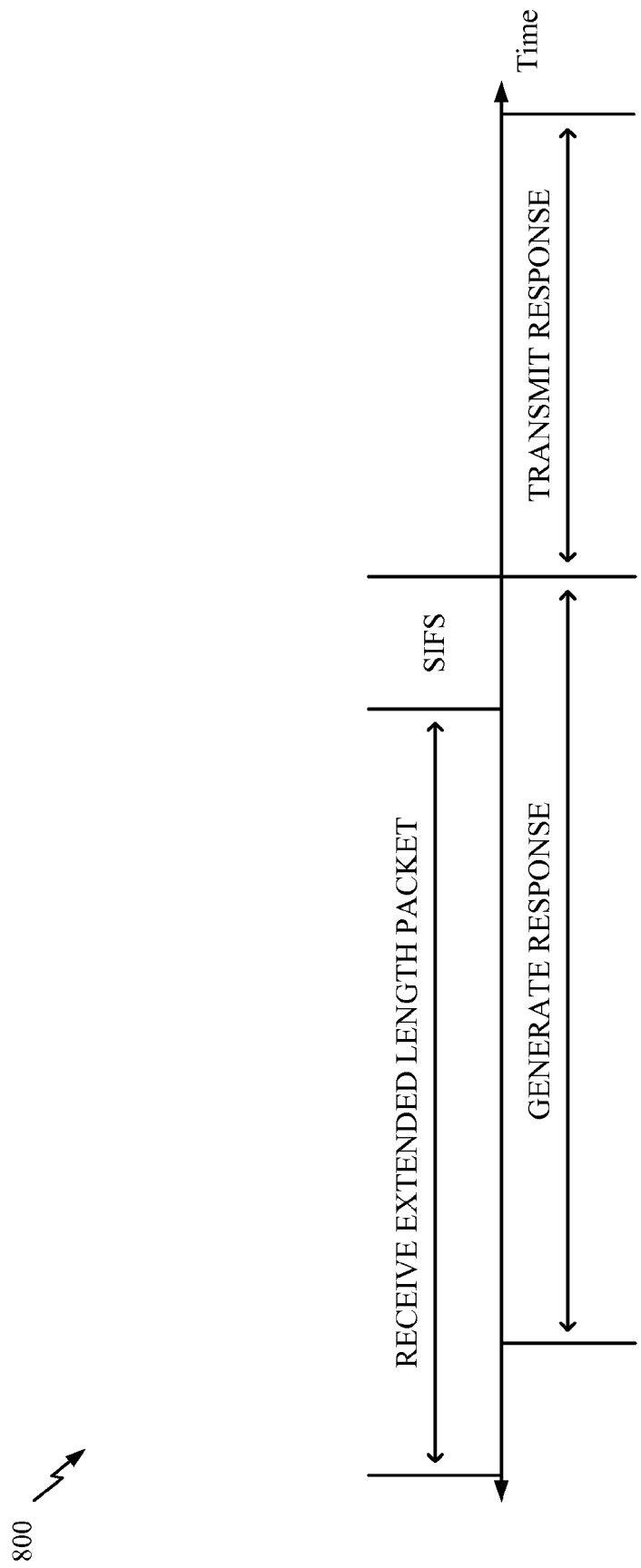
FIG. 8 illustrates an example timeline of reception and transmission of extended length packets, in accordance with certain aspects of the present disclosure.

As illustrated, in FIGS. 1 and 2, an AP may send a HEW packet, with a preamble format as described herein (e.g., in accordance with one of the example formats shown in FIGS. 6-8).

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
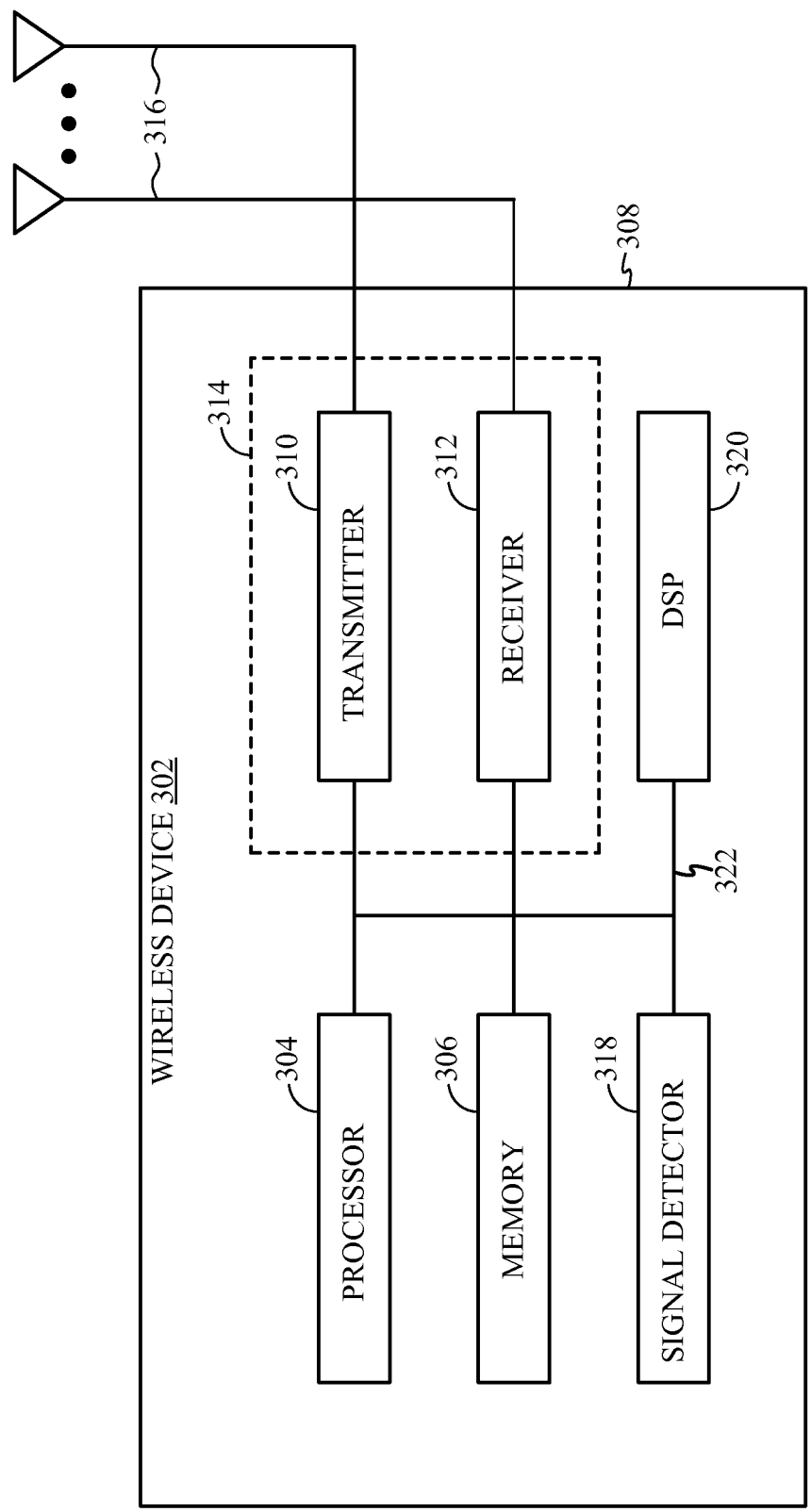
FIG. 3 illustrates a block diagram of an example wireless device in accordance with certain aspects of the present disclosure.

FIG. 3 illustrates various components that may be utilized in a wireless device 302 that may be employed within a wireless communication system (e.g., system 100 of FIG. 1). The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Response Time Relaxation for High Efficiency WLAN

When packets having an increased symbol duration or increased cyclic prefix are transmitted, the amount of data to be processed by a receiver may be increased. With increases in the amount of data to process, there may be difficulties in meeting response timelines (e.g., of transmitting a response within an amount of time after receiving a packet). Certain aspects of the present disclosure provide mechanisms for supporting response generation timelines when extended symbol lengths are used.

Figure 4:
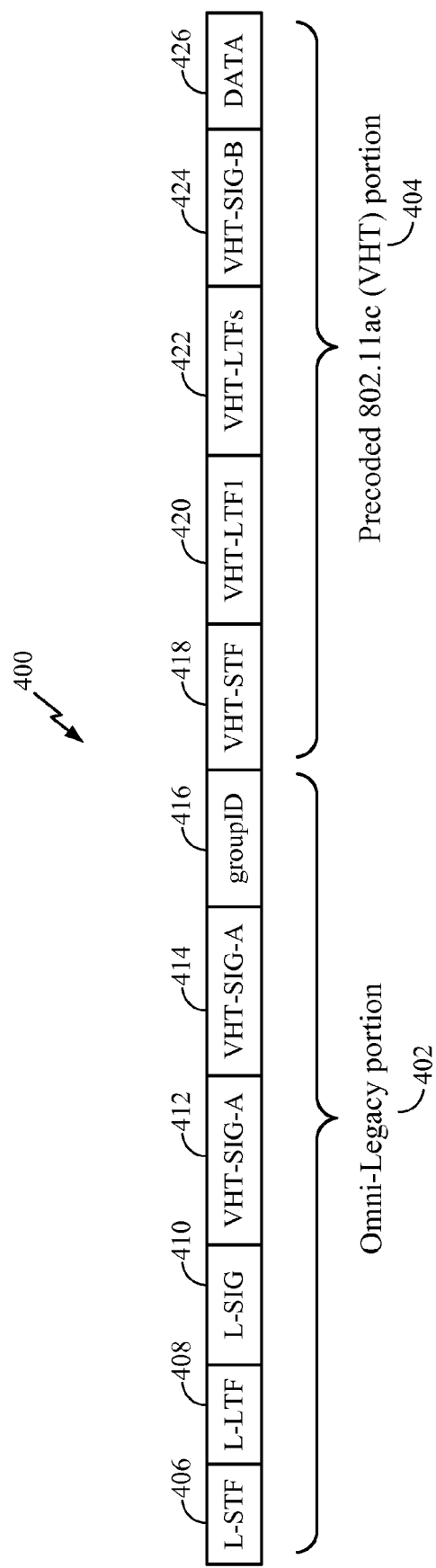
FIG. 4 illustrates an example structure of a preamble transmitted from an access point in accordance with certain aspects of the present disclosure.

FIG. 4 illustrates an example structure of a preamble 400 in accordance with certain aspects of the present disclosure. The preamble 400 may be transmitted, for example, from the access point (AP) 110 to the user terminals 120 in a wireless network (e.g., system 100 illustrated in FIG. 1).

The preamble 400 may comprise an omni-legacy portion 402 (i.e., the non-beamformed portion) and a precoded 802.11ac VHT (Very High Throughput) portion 404. The omni-legacy portion 402 may comprise: a Legacy Short Training Field (L-STF) 406, a Legacy Long Training Field 408, a Legacy Signal (L-SIG) field 410, and two OFDM symbols 412, 414 for VHT Signal A (VHT-SIG-A) fields. The VHT-SIG-A fields 412, 414 may be transmitted omni-directionally and may indicate allocation of numbers of spatial streams to a combination (set) of STAs. For certain aspects, a group identifier (groupID) field 416 may be included in the preamble 400 to convey to all supported STAs that a particular set of STAs will be receiving spatial streams of a MU-MIMO transmission.

The precoded 802.11ac VHT portion 404 may comprise a Very High Throughput Short Training Field (VHT-STF) 418, a Very High Throughput Long Training Field 1 (VHT-LTF1) 420, Very High Throughput Long Training Fields (VHT-LTFs) 422, a Very High Throughput Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

Larger Delay Spread Support for WiFi Bands

Outdoor wireless networks with high access point (AP) elevation (e.g., on a Pico/Macro cell tower) may experience channels that have high delay spreads, well in excess of 1 μs. Various wireless systems, such as those in accordance with 802.11a/g/n/ac, utilize orthogonal frequency division multiplexing (OFDM) physical layer (PHY) in the 2.4 and 5 GHz band has a Cyclic Prefix (CP) length of only 800 ns, nearly half of which is consumed by transmit and receive filters. Hence, these types of systems are typically considered unsuitable for such deployments, since WiFi packets with higher modulation and coding scheme (MCS) (e.g.: beyond MCS0) are difficult to decode in high delay spread channels.

According to aspects of the present disclosure, a packet format (PHY waveform) that is backwards compatible with such legacy systems and supports cyclic prefixes longer than 800 ns is provided that may would allow the use of 2.4 and 5 GHz WiFi systems, in outdoor deployments with high APs.

Figure 5:
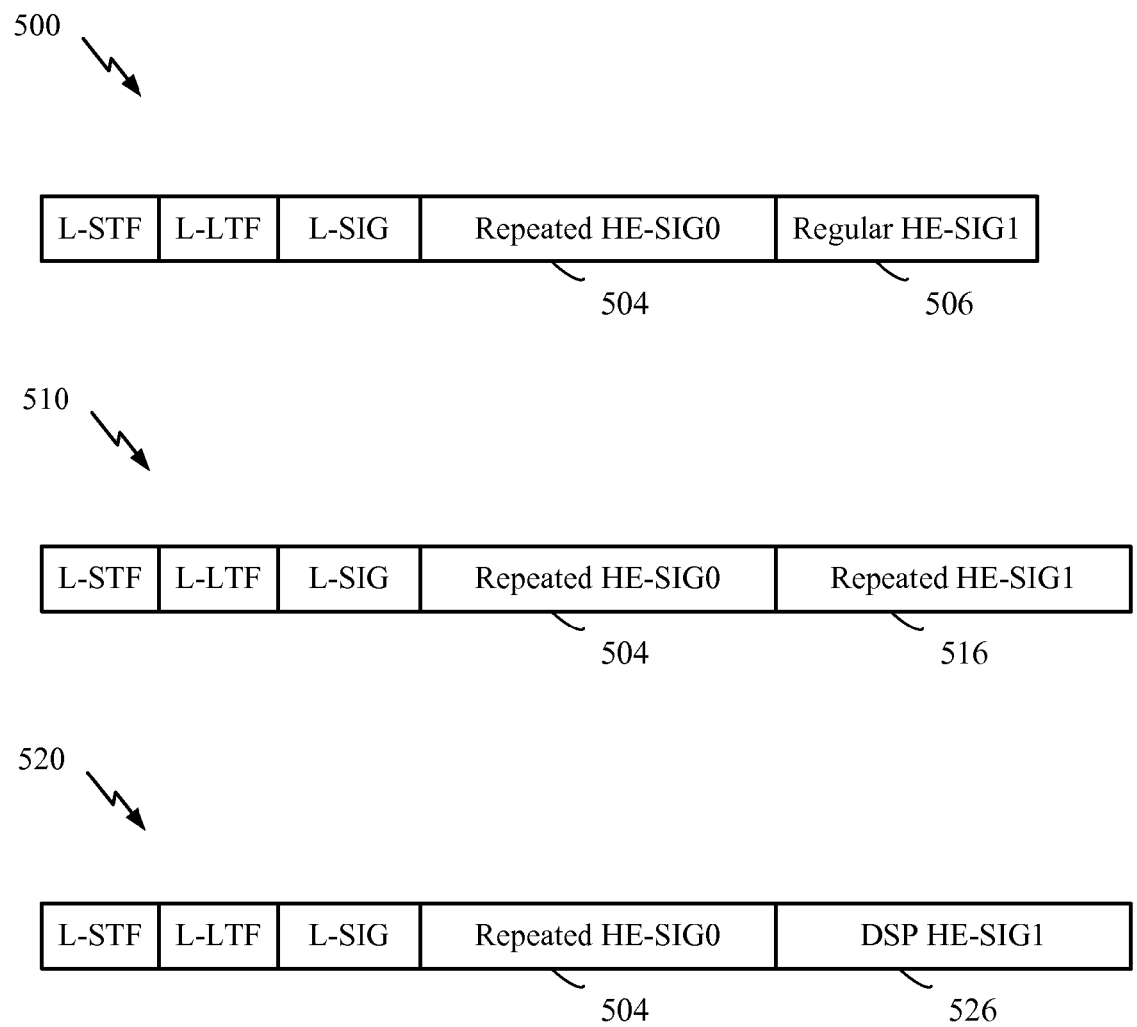
FIG. 5 illustrates example preamble structures.

According to certain aspects of the present disclosure, 1 or more bits of information are embedded in one or more of the legacy short training field (L-STF), the legacy long training field (L-LTF), the legacy signal field (L-SIG), very high throughput signal (VHT-SIG), and very high throughput short training field (VHT-STF) in the preamble of the PHY waveform that a new device can decode, but does not impact decoding by legacy (e.g., 802 11a/g/n/ac) receivers. FIG. 5 illustrates example existing preamble frame structures, for 802.11a/g, 802.11n, and 802.11ac.

L-SIG is binary phase shift keying (BPSK) modulated. HT-SIG is quadrature-BPSK (Q-BPSK) modulated. The 2nd OFDM symbol of VHT-SIG is Q-BPSK modulated. The "Q" rotation, may allows receiver to differentiate between 11a/g, 11n and 11ac waveforms.

For certain aspects, 1 or more bits of information are embedded in one or more of L-STF, L-LTF, L-SIG, VHT-SIG, and VHT-STF that a new device can decode, but do not impact decoding by legacy 11a/g/n/ac receivers. The one or more bits of information are backwards compatible with the legacy preamble, i.e., 11a/g/n/ac devices are able to decode the preamble and then defer until the transmission is over.

According to certain aspects, for delay spread tolerance, different transmission parameters may be used to increase symbol duration (e.g., downclocking to actually decrease sample rate or increasing FFT length while maintaining a same sample rate). The symbol duration may be increased, for example, 2× to 4×, to increase tolerance to higher delay spreads. The increase may be accomplished via downclocking (using a lower sampling rate with a same FFT length) or by increasing a number of subcarriers (a same sampling rate, but increased FFT length).

Use of an increase symbol duration may be considered a physical layer (PHY) transmission mode that can be signaled in the SIG field, which may allow a normal symbol duration mode to be maintained. Preserving the "normal" symbol duration mode may be desirable (even for devices that are capable of using it) because increased symbol duration typically means increased FFT size, which brings with it an increased sensitivity to frequency error and increased PAPR. Further, not every device in a network will need this increased delay spread tolerance and, in such cases, increased FFT size can actually hurt performance.

Depending on a particular implementation, such an OFDM symbol duration increase (e.g., through an increase in number of sub-carriers) may happen after the SIG field in all packets—or may be signaled for only some packets. The SIG field may be a high efficiency SIG (HE-SIG) field (as defined by IEEE 802.11 High Efficiency WLAN or HEW Study Group) or a VHT-SIG-A field (e.g., per 802.11ac).

If not applied to all packets, OFDM symbol duration increase (e.g., through an increase in number of sub-carriers) may happens after the SIG field only in packets where information in SIG field signals the change. The information may be conveyed through a bit in the SIG field, through a Q-BPSK rotation of a SIG field symbol, or through hidden information in the orthogonal rail (imaginary axis) of any of the SIG fields.

Increased symbol duration may also be used for UL transmissions. For the UL transmissions, it is possible that the AP indicates through a DL message that it wants the next transmission to be with increased symbol duration. For example, in UL OFDMA, the AP may send a tone allocation message which along with distributing the tone allocation also tells the users to use longer symbol durations. In that case, the UL packet itself does not need to carry the indication about this numerology change. That is because AP was the one which initiated this transmission in the first place and decided the symbol duration to be used by the STAs in the UL.

The indication may be conveyed in the preamble (as described above) or may be conveyed via one or more bits in a data payload of the DL frame. Such payload will be understandable only by devices that support the increased symbol duration. In addition, the increased symbol duration in the UL may be applied to the whole UL packet, as well. As an alternative, the indication may also be conveyed separately from the DL frame. For example, use of increase symbol duration on the UL could be scheduled semi-persistently, where a STA is signaled whether (or not) to use increased symbol duration on UL transmissions. This approach may save an AP from having to signal in each DL frame.

Example Response Time Relaxation

Aspects of the present disclosure provide methods for supporting response frame generation for packets having an increased symbol duration or increased cyclic prefix relative to a portion of the packet generated using a standard symbol duration or standard cyclic prefix that may be used in advanced systems, such as HEW (High Efficiency WiFi or High Efficiency WLAN).

When increased length symbols, such as a 4× Orthogonal Frequency Division Multiplexing (OFDM) symbol, are used, for example, for increasing tolerances for large delay spreads, the number of bits to be processed after each symbol may increase by the amount the symbol length is enlarged. The increase in the number of bits to process may make it difficult to meet response timelines. For example, a device may not be able to process an extended length packet (i.e., a packet having increased length symbols or an increased length cyclic prefix relative to a portion of the packet generated using a standard symbol duration or standard cyclic prefix) and provide an immediate acknowledgment or a response within an expected time after transmission (e.g., a short interframe space (SIFS) duration after receiving the packet) due to a lack of time. Further, leaving the SIFS duration unmodified may provide for coexistence of devices that support HEW and devices that may not support HEW.

On the transmission side, padding symbols may be added to a transmission having extended length symbols. Padding symbols may have a standard length, such as the length of a preamble symbol. In some aspects, padding symbols may be extended length symbols. For example, the padding symbols may be four times the length of a standard padding symbol. In some cases, the padding symbols may include a single padding symbol with an increased cyclic prefix relative to a cyclic prefix used in another portion of the packet (e.g., a cyclic prefix with a length greater than 800 ns). In some aspects, the padding symbols may comprise information to solicit channel feedback from a receiving station (e.g., reference signals) or other information that need not be acknowledged by a receiver, such as network management or scheduling packets. Padding symbols may be added in certain situations. For example, padding may be added based on whether a packet is transmitted using a high modulation and coding scheme (MCS), whether a packet is non-aggregated, the number of spatial streams used, or the amount of data to process (e.g., the amount of data in the last data symbol to process). A packet having extended length symbols may have an indication that can be used to determine the presence of padding symbols in the packet.

A receiving station can be configured to generate at least a preamble of a response to a transmitted packet before the completely processing the entire packet. In this manner, the receiving station may have generated at least a preamble by the time the entire packet is received and may begin to transmit the response a SIFS period after receiving the response. While the receiving station is transmitting at least the preamble of the response, the receiving station can continue to process the received packet and generate the remainder of the response.

In an aspect, a null data packet (NDP) format for MAC control purposes that is robust to large delay spread may be defined. For example, a longer preamble may be used to provide for delay spread protection on the HE-SIG0 field. A station that receives an extended length packet may generate an NDP having an extended symbol duration or cyclic prefix relative to at least a portion of a response packet. Receiving an extended length packet having a longer preamble may allow a receiving station to have more time to generate a packet due to the increased size of the preamble and the accompanying increase in the amount of time needed to process the preamble.

In an aspect where a receiving station receives an increased length packet (e.g., a 4×HEW packet), the receiving station may likewise respond with an increased length packet. Responding with an increased length packet may entail generating a longer preamble, and thus, the data portion of the response packet may start later than the beginning of the data portion of a standard-length packet (e.g., a packet with symbols that are the standard OFDM symbol length). Responding to an increased length packet with an increased length packet may provide additional time for the receiving station to process the received increased length packet. Responding with an increased length packet may be used, for example, in response to an aggregated MAC protocol data unit (A-MPDU), where for some MPDUs, the frame check sequence (FCS) check may have already been completed before decoding the last increased length symbol.

FIG. 6 illustrates example operations 600 that may be executed by a transmitting station in accordance with aspects of the present disclosure. Operations 600 may begin at 602, where a transmitting station generates a packet having a preamble decodable by a first type of device having a first set of capabilities and a second type of device having a second set of capabilities, wherein at least a first portion of the packet is generated using an increased symbol duration or increased cyclic prefix relative to a second portion of the packet generated using a standard symbol duration or standard cyclic prefix and the packet includes padding symbols after the first portion. At 604, the transmitting station outputs the generated packet for transmission.

FIG. 7 illustrates example operations 700 that may be executed by a receiving station in accordance with aspects of the present disclosure. Operations 700 may begin at 702, where a receiving station obtains a packet having a preamble decodable by a first type of device having a first set of capabilities and a second type of device having a second set of capabilities, wherein at least a first portion of the packet is generated using an increased symbol duration or increased cyclic prefix relative to a second portion of the packet generated using a standard symbol duration or standard cyclic prefix and the packet includes padding symbols after the first portion. At 704, the receiving station begins to process the first portion of the packet before the receiving station has received the entire packet and generate a response packet for transmission within an expected time after receipt of the entire packet.

FIG. 8 illustrates an example timeline 800 of operations 700 executed by a receiving station in accordance with aspects of the present disclosure. As illustrated, while a receiving station is receiving an extended length packet (e.g., generated using an increased symbol duration or increased cyclic prefix relative to a second portion of the packet generated using a standard symbol duration or standard cyclic prefix), the receiving station can begin processing the received packet and generating a response to the packet. By processing the received packet and generating a response to the packet before the packet is fully received, the receiving station may generate a response before a time at which the station is required to transmit the response. Thus, the response may be transmitted within a short interframe space (SIFS) after reception of the packet ends.

Figure 9:
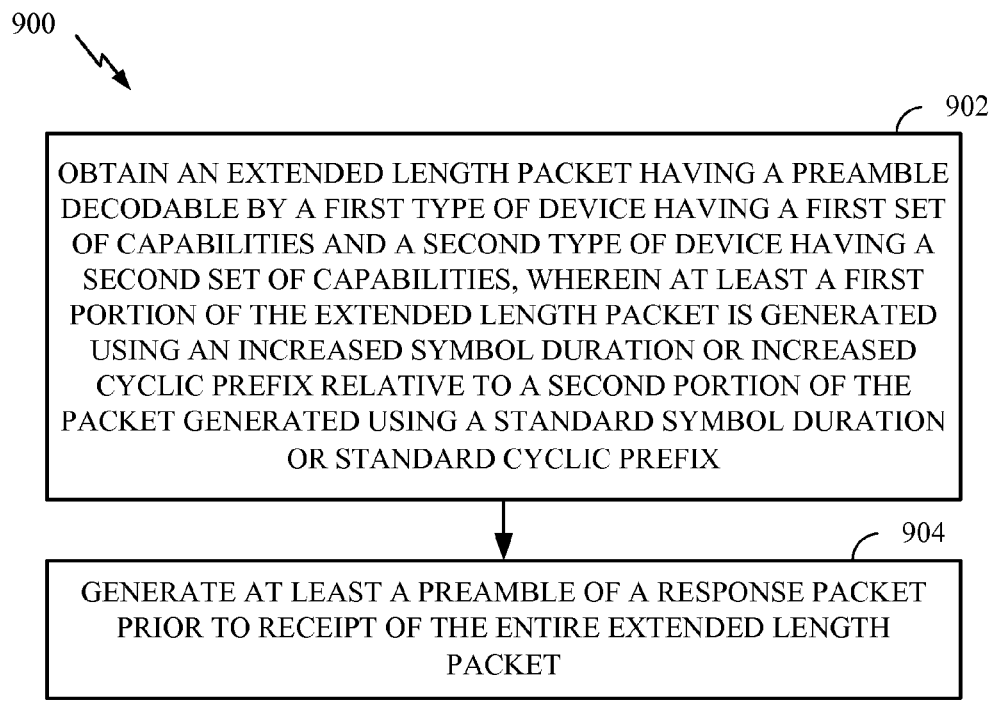
FIG. 9 illustrates example operations that may be performed by a receiving station, in accordance with certain aspects of the present disclosure.

FIG. 9 illustrates example operations 900 that may be executed by a receiving station in accordance with aspects of the present disclosure. Operations 900 may begin at 902, where a receiving station obtains an extended length packet having a preamble decodable by a first type of device having a first set of capabilities and a second type of device having a second set of capabilities, wherein at least a first portion of the extended length packet is generated using an increased symbol duration or increased cyclic prefix relative to a second portion of the packet generated using a standard symbol duration or standard cyclic prefix. At 904, the receiving station generates at least a preamble of a response packet prior to receipt of the extended length packet.

Figure 10:
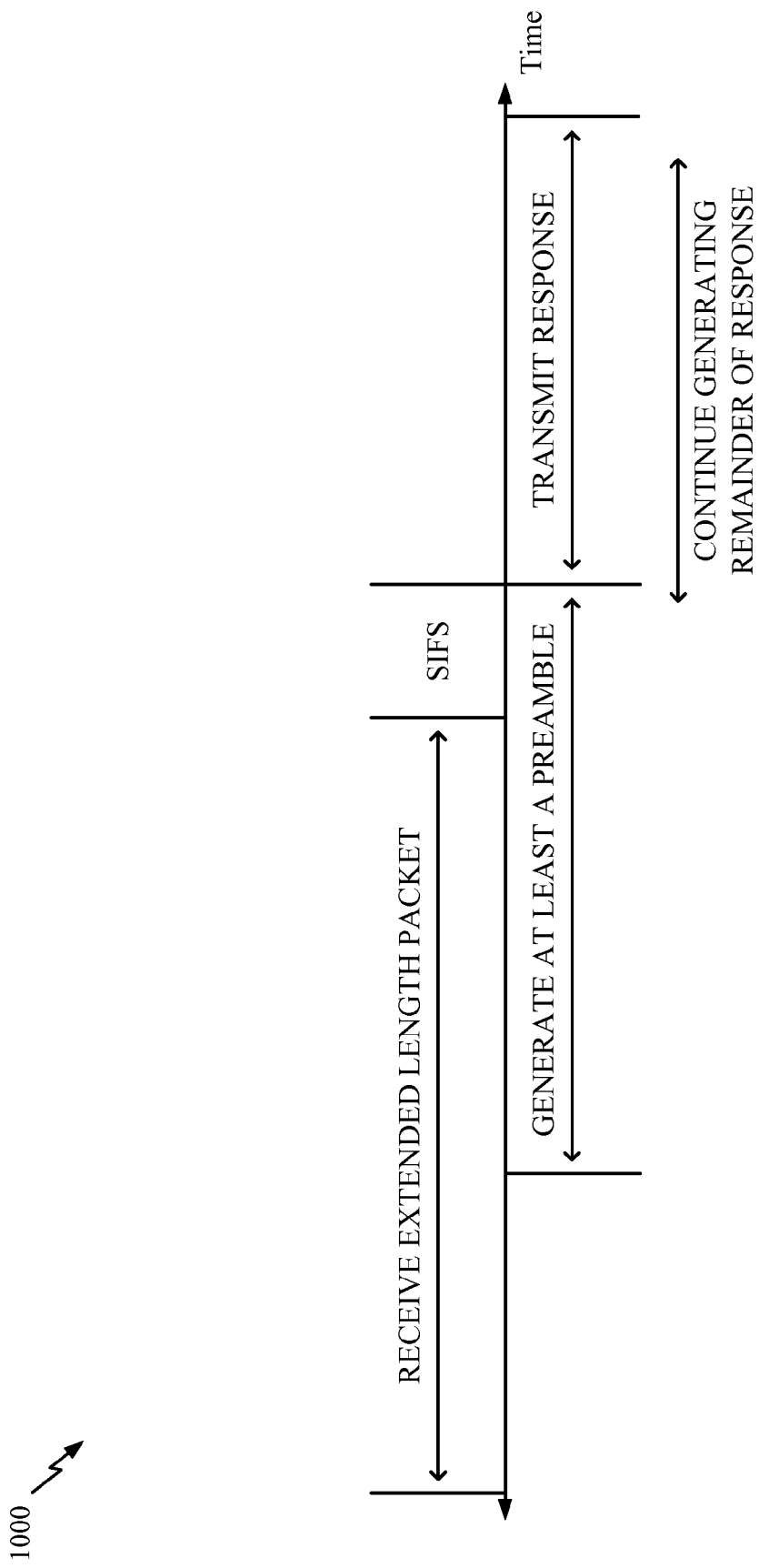
FIG. 10 illustrates an example timeline of reception and transmission of extended length packets, in accordance with certain aspects of the present disclosure.

FIG. 10 illustrates an example timeline of operations 900 executed by a receiving station in accordance with aspects of the present disclosure. As illustrated, while a receiving station is receiving an extended length packet (e.g., generated using an increased symbol duration or increased cyclic prefix relative to a second portion of the packet generated using a standard symbol duration or standard cyclic prefix), the receiving station may generate at least a preamble of a response. By the time that the station is required to transmit a response (e.g., a SIFS after reception of a packet is completed), the receiving station may begin transmitting the portion of the response that has been generated and transmit the remainder of the response as the remainder of the response is generated.

Example End of Packet Estimation Using Padding Symbols

According to certain aspects, padding symbols may be used to determine the end of a packet or round trip time (RTT). According to certain aspects, padding may be an OFDM symbol with binary phase shift keying (BPSK) data that signals a number of transmit antennas used and what cyclic delays are used. According to certain aspects, this information in the symbol may used by a receiver to compute a precise end-of-packet timing. For example, the receiver may estimate a channel impulse response, based on the number of transmit antennas and cyclic delays. The receiver may perform a windowed inverse fast Fourier transform (IFFT) to obtain the estimate. Then receiver may correct the transformed estimate to compensate for the known cyclic delays.

According to certain aspects, padding may be a Zadoff single carrier sequence that has a perfect autocorrelation and that allows the receiver to use a simple correlator. If the padding is transmitted by multiple transmitters, it may be desirable to signal the number of transmitters and cyclic delays, either by modulating the padding single carrier sequences, or by adding this information in the packet prior to padding.

According to certain aspects, only one transmitter may be used for padding, such that there is no need to signal the number of transmitters and cyclic delays.

Example Angle-of-Arrival and Angle-of-Departure Estimation Using Padding Symbols According to certain aspects, padding symbols may be used to estimate angle of arrival and/or angle of departure. For example, angle-of-departure may be estimated by determining the phase difference of the first arriving paths in the estimated impulse response from different transmit antennas. For this approach, it may be desirable that there is line of sight, that the receiver knows the number of transmit antennas and cyclic delays, that the cyclic delays are large enough that impulse responses of different transmitters do not significantly overlap, and that the transmitters are calibrated to have zero or near zero phase differences. For implicit beamforming, the calibrations may already be done.

According to certain aspects, if a device has more than one receiver, the device may estimate both transmit angle-of-departure and receive angle-of-arrival by estimating the phase differences between different receivers for the same transmit impulse response.

Figure 6A:
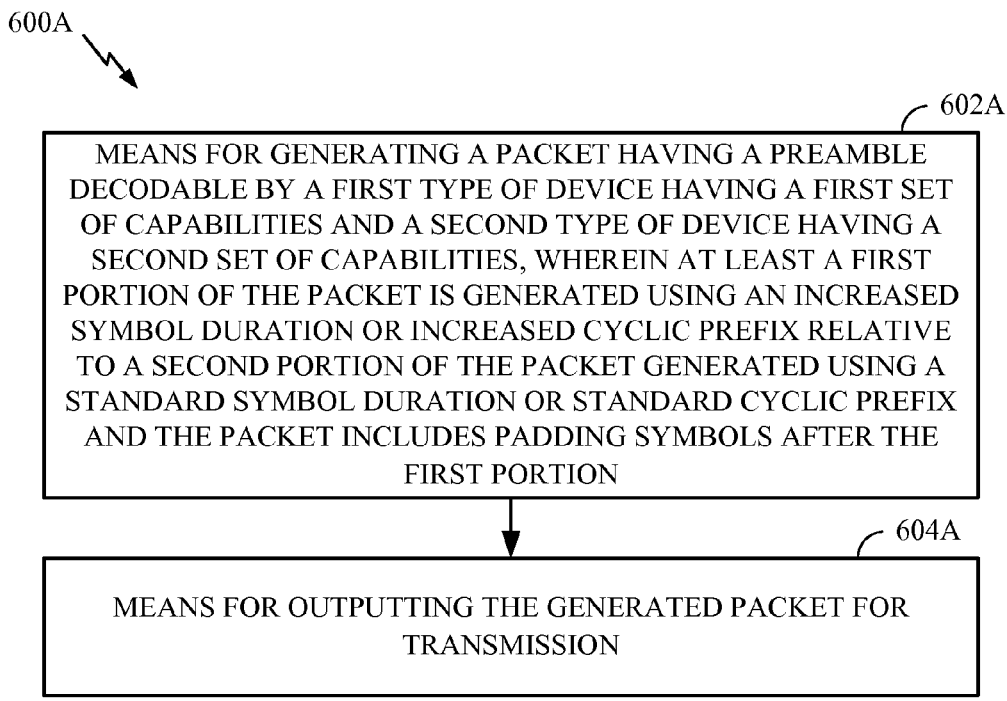
FIG. 6A illustrates example components capable of performing the operations shown in FIG. 6.
Figure 7A:
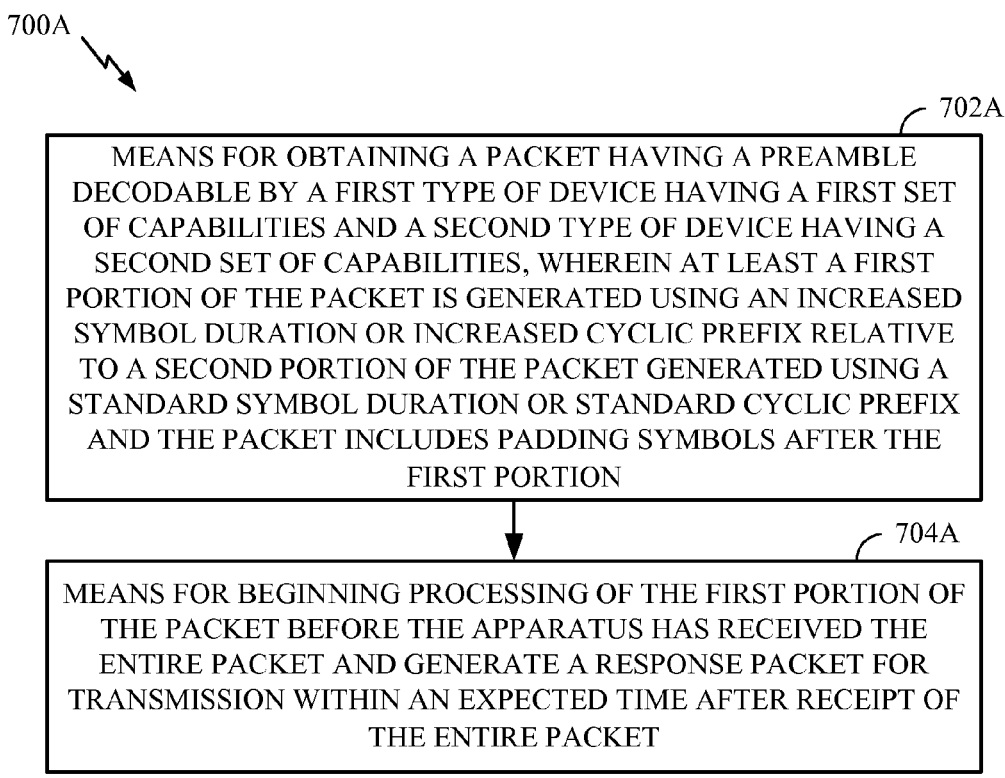
FIG. 7A illustrates example components capable of performing the operations shown in FIG. 7.
Figure 9A:
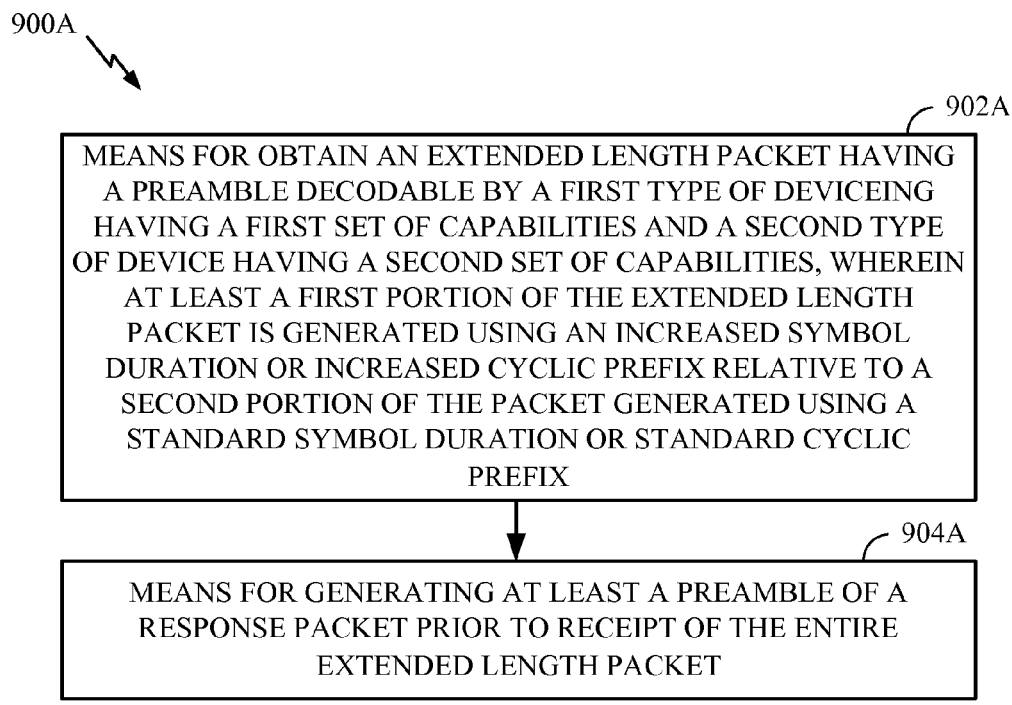
FIG. 9A illustrates example components capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600, 700, and 900 illustrated in FIGS. 6, 7, and 9 may correspond to means 600A, 700A, and 900A illustrated in FIGS. 6A, 7A, and 9A.

For example, means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for processing, means for determining, means for altering, means for generating, means for correcting, and/or means for checking may comprise a processing system, which may include one or more processors, such as the RX data processor 270 and/or the controller 280 of the user terminal 120 or the RX data processor 242 and/or the controller 230 of the access point 110 illustrated in FIG. 2. The processing system may also include a correlator.

Further, in some cases, rather than actually transmit a subframe (or other structure), an entity (e.g., a processor) may output such a structure via a transmit interface to another entity (e.g., an RF front end or modem) for transmission. Similarly, rather than actually receive a subframe (or other structure), an entity (e.g., a processor) may receive such a structure from another entity (e.g., from an RF front end or modem) via a receive interface. For example, the receive interface may include a bus interface or other type interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
generate a packet having a preamble decodable by a first type of device having a first set of capabilities and a second type of device having a second set of capabilities, wherein at least a first portion of the packet is generated using an increased symbol duration or increased cyclic prefix relative to a second portion of the packet generated using a standard symbol duration or standard cyclic prefix and the packet includes one or more padding symbols after the first portion; and
a transmit interface configured to output the generated packet for transmission.

2. The apparatus of claim 1, wherein the packet has an indication that the padding symbols are included in the packet.

3. The apparatus of claim 1, wherein the one or more padding symbols comprise a single padding symbol with an increased cyclic prefix relative to the second portion.

4. The apparatus of claim 1, wherein:
the processing system is further configured to process a second packet received within an expected time after transmission of the packet.

5. The apparatus of claim 1, wherein the processing system is configured to generate padding symbols only for packets to be transmitted using a particular set of modulation and coding scheme (MCS) types, a particular set of spatial streams, or a particular amount of data in the packet.

6. The apparatus of claim 1, further comprising:
an antenna coupled to the transmit interface, wherein the packet is transmitted via the antenna, and wherein the apparatus is configured as an access point.

7. An apparatus for wireless communications, comprising:
a receive interface configured to obtain a packet having a preamble decodable by a first type of device having a first set of capabilities and a second type of device having a second set of capabilities, wherein at least a first portion of the packet was generated using an increased symbol duration or increased cyclic prefix relative to a second portion of the packet generated using a standard symbol duration or standard cyclic prefix and the packet includes one or more padding symbols after the first portion; and
a processing system configured to begin processing the first portion of the packet before the apparatus has received the entire packet and generate a response packet for transmission within an expected time after receipt of the entire packet.

8. The apparatus of claim 7, wherein the processing system is configured to determine presence of the padding symbols based on an indication in the packet.

9. The apparatus of claim 7, wherein the one or more padding symbols comprise a single padding symbol with an increased cyclic prefix relative to the second portion.

10. The apparatus of claim 7, wherein:
the padding symbols comprise network management or scheduling information; and
the processing system is configured to use the network management or scheduling information in generating packets for transmission or processing received packets.

11. The apparatus of claim 7, wherein the processing system is further configured to:
determine phase differences of one or more arriving paths; and
estimate an angle of departure of the packet based on the determined phase differences.

12. The apparatus of claim 7, wherein the processing system is further configured to:
determine phase differences between different receive antennas; and
estimate an angle of arrival of the packet based on the determined phase differences.

13. The apparatus of claim 7, wherein the processing system is further configured to:
estimate a channel impulse response to compute end of packet timing, wherein the estimation is based on the padding symbols.

14. The apparatus of claim 7, wherein the processing system is configured to generate at least a preamble of the response packet prior to receipt of the entire packet.

15. The apparatus of claim 14, wherein:
a portion of the preamble of the response packet has a same increased symbol duration or increased cyclic prefix as the at least a first portion of the entire packet.

16. The apparatus of claim 7, further comprising:
an antenna coupled to the receive interface, wherein the packet is received via the antenna, and wherein the apparatus is configured as a user terminal.

17. A method for wireless communications, comprising:
generating a packet having a preamble decodable by a first type of device having a first set of capabilities and a second type of device having a second set of capabilities, wherein at least a first portion of the packet is generated using an increased symbol duration or increased cyclic prefix relative to a second portion of the packet generated using a standard symbol duration or standard cyclic prefix and the packet includes one or more padding symbols after the first portion; and
outputting the generated packet for transmission.

18. The method of claim 17, wherein the packet has an indication that the padding symbols are included in the packet.

19. The method of claim 17, wherein the one or more padding symbols comprise a single padding symbol with an increased cyclic prefix relative to the second portion.

20. The method of claim 17, further comprising:
processing a second packet received within an expected time after transmission of the packet.

21. The method of claim 17, further comprising: generating padding symbols only for packets to be transmitted using a particular set of modulation and coding scheme (MCS) types, a particular set of spatial streams, or a particular amount of data in the packet.

22. A method for wireless communications, comprising:
receiving a packet having a preamble decodable by a first type of device having a first set of capabilities and a second type of device having a second set of capabilities, wherein at least a first portion of the packet is generated using an increased symbol duration or increased cyclic prefix relative to a second portion of the packet generated using a standard symbol duration or standard cyclic prefix and the packet includes one or more padding symbols after the first portion;

beginning processing the first portion of the packet before the apparatus has received the entire packet; and generating a response packet for transmission within an expected time after receipt of the entire packet.

23. The method of claim 22, further comprising:

determining presence of the padding symbols based on an indication in the packet.

24. The method of claim 22, wherein the one or more padding symbols comprise a single padding symbol with an increased cyclic prefix relative to the second portion.

25. The method of claim 22, wherein:

the padding symbols comprise network management or scheduling information; and the network management or scheduling information is used in generating packets for transmission or processing received packets.

26. The method of claim 22, further comprising:

determining phase differences of one or more arriving paths; and estimating an angle of departure of the packet based on the determined phase differences.

27. The method of claim 22, further comprising:

determining phase differences between different receive antennas; and estimating an angle of arrival of the packet based on the determined phase differences.

28. The method of claim 22, further comprising:

estimating a channel impulse response to compute end of packet timing, wherein the estimation is based on the padding symbols.

29. The method of claim 22, wherein the generating the response packet comprises generating at least a preamble of the response packet prior to receipt of the entire packet.

30. The method of claim 29, wherein a portion of the preamble of the response packet has a same increased symbol duration or increased cyclic prefix as the at least a first portion of the entire packet.

* * * * *